(12) United States Patent
Khawam

(10) Patent No.: US 10,220,959 B2
(45) Date of Patent: Mar. 5, 2019

(54) AIRCRAFT LIGHTING SYSTEM

(71) Applicant: Maurice A Khawam, Lakewood, CA (US)

(72) Inventor: Maurice A Khawam, Lakewood, CA (US)

( * ) Notice: Subject to any disclaimer, the term of this patent is extended or adjusted under 35 U.S.C. 154(b) by 362 days.

(21) Appl. No.: 14/999,817

(22) Filed: Jul. 1, 2016

(65) Prior Publication Data

US 2018/0002034 A1 Jan. 4, 2018

(51) Int. Cl.
*B64D 47/06* (2006.01)
*F03D 80/10* (2016.01)
*A01M 29/10* (2011.01)
*B64D 45/00* (2006.01)

(52) U.S. Cl.
CPC .............. *B64D 47/06* (2013.01); *A01M 29/10* (2013.01); *B64D 2045/0095* (2013.01); *B64D 2203/00* (2013.01); *F03D 80/10* (2016.05)

(58) Field of Classification Search
CPC ...... A01M 29/00; A01M 29/06; A01M 29/08; A01M 29/09; A01M 29/10; B64D 45/00; B64D 47/06; B64D 2045/0095; B64D 2203/00; F03D 80/00; F03D 80/10
USPC ................. 116/22 A, 202; 340/981
See application file for complete search history.

(56) References Cited

U.S. PATENT DOCUMENTS

| | | |
|---|---|---|
| 3,935,922 A | 2/1976 | Cooper |
| 4,066,890 A | 1/1978 | Hamilton |
| 4,736,907 A | 4/1988 | Steffen |
| 5,270,707 A | 12/1993 | Schulte |
| 5,557,460 A | 9/1996 | Bennett |
| 5,585,160 A | 12/1996 | O Hassel |
| 5,774,088 A | 6/1998 | Kreithen |
| 5,969,593 A | 10/1999 | Will |
| 6,250,255 B1 | 6/2001 | Lenhardt |
| 6,351,908 B1 | 3/2002 | Thomas |
| 6,575,597 B1 | 6/2003 | Cramer |
| 6,653,971 B1 | 11/2003 | Guice |
| 6,940,424 B2 * | 9/2005 | Philiben et al. ....... B64D 47/06 340/435 |

(Continued)

FOREIGN PATENT DOCUMENTS

| | | | | |
|---|---|---|---|---|
| DE | 202013000562 U1 * | 2/2013 | ............. | F03D 80/00 |
| JP | 2006020598 A * | 1/2006 | ............. | A01M 29/00 |
| WO | WO 2012072084 A1 * | 6/2012 | ............. | A01M 29/08 |

*Primary Examiner* — R. A. Smith
(74) *Attorney, Agent, or Firm* — Gray Law Firm; Gordon E. Gray, III

(57) ABSTRACT

The present invention is an aircraft lighting system. In particular, the present invention is directed to an aircraft lighting system with light that is directed toward an aircraft's engines to deter bird strikes. The lighting system for a jet-powered aircraft has at least one light mounted on an aircraft fuselage aimed at an engine inlet of an engine nacelle of the aircraft. The illumination from the light comprises ultraviolet light between 300 and 400 nm in wavelength and the light flashes at a pre-determined frequency preferably between 1 and 3 Hz. Additional lights can be mounted on the engine nacelles to illuminate outer engine nacelles. Preferably, the engine of the aircraft also has blades coated in fluorescent or iridescent paint to increase the reflectivity of the blades to further illuminate the blades of the engine. The lighting system preferably automatically illuminates the engine inlets during take-off and descent.

8 Claims, 19 Drawing Sheets

(56) References Cited

U.S. PATENT DOCUMENTS

| | | |
|---|---|---|
| 7,106,180 B1 | 9/2006 | Pompei |
| 7,106,216 B1 | 9/2006 | Maher |
| 7,173,534 B1 | 2/2007 | Markham |
| 7,344,264 B2 * | 3/2008 | Tamaoki ............... A01M 29/08 257/E25.021 |
| 7,645,053 B2 | 1/2010 | Machi |
| 7,654,217 B2 | 2/2010 | Sullivan |
| 7,971,827 B2 | 7/2011 | Barrientos |
| 8,164,462 B1 | 4/2012 | Bose |
| 8,651,664 B2 * | 2/2014 | Harvey et al. ....... G03B 21/145 244/117 R |
| 8,667,930 B2 | 3/2014 | Hornung |
| 8,816,863 B2 | 8/2014 | Arman |
| 8,847,768 B2 | 9/2014 | Craven |
| 8,869,732 B1 | 10/2014 | Chervick |
| 9,414,581 B1 | 8/2016 | Riesland |
| 2002/0008642 A1 | 1/2002 | Ersson |
| 2002/0064628 A1 | 5/2002 | Carr |
| 2003/0090391 A1 | 5/2003 | Philben |
| 2003/0174504 A1 | 9/2003 | Tamaoki |
| 2005/0040970 A1 | 2/2005 | Hutchins |
| 2005/0045762 A1 | 3/2005 | Pham |
| 2005/0145162 A1 | 7/2005 | Marcus |
| 2005/0163339 A1 | 7/2005 | Watanabe |
| 2006/0119482 A1 | 6/2006 | Hanscom |
| 2006/0223411 A1 | 10/2006 | Burchett |
| 2006/0284736 A1 * | 12/2006 | Low ....................... B64D 43/00 340/980 |
| 2007/0190343 A1 * | 8/2007 | Arkles ................. A01M 29/08 428/447 |
| 2009/0065715 A1 | 3/2009 | Wainright |
| 2009/0092646 A1 | 4/2009 | Dunham |
| 2009/0130349 A1 | 5/2009 | Alvarez |
| 2010/0079729 A1 | 4/2010 | Scanlon |
| 2010/0098844 A1 * | 4/2010 | Pettinger ............... A01M 29/08 427/164 |
| 2010/0134271 A1 | 6/2010 | Edwards |
| 2010/0192834 A1 | 8/2010 | Fogiel |
| 2010/0201525 A1 | 8/2010 | Bahat |
| 2010/0236497 A1 * | 9/2010 | Philiben et al. ..... A01K 11/008 119/712 |
| 2010/0270427 A1 | 10/2010 | Barrientos |
| 2011/0095912 A1 | 4/2011 | Sands |
| 2011/0121128 A1 | 5/2011 | Balkus, Jr. |
| 2011/0134397 A1 | 6/2011 | Kayser |
| 2012/0113754 A1 | 5/2012 | Husseiny |
| 2013/0087720 A1 | 4/2013 | Cesnik |
| 2013/0101417 A1 * | 4/2013 | Cloninger, II et al. ..................... F03D 1/065 416/61 |
| 2013/0180466 A1 | 7/2013 | Brown |
| 2013/0298845 A1 | 11/2013 | Blanchard |
| 2014/0219947 A1 | 8/2014 | Montgomery |
| 2014/0261151 A1 | 9/2014 | Ronning |
| 2014/0300497 A1 | 10/2014 | Harms |
| 2014/0305382 A1 * | 10/2014 | Hill ....................... A01M 29/08 119/713 |
| 2014/0377060 A1 * | 12/2014 | Quell ...................... G08B 5/38 416/1 |
| 2015/0010399 A1 * | 1/2015 | Bahat et al. .......... A01M 29/08 416/1 |
| 2015/0160385 A1 | 6/2015 | Hicks |
| 2016/0029615 A1 * | 2/2016 | Newcamp et al. ... A01M 29/10 119/713 |
| 2016/0280368 A1 | 9/2016 | Schoen |
| 2016/0296649 A1 | 10/2016 | Ramanand |
| 2016/0366875 A1 * | 12/2016 | Green et al. .......... A01M 29/18 |
| 2017/0099828 A1 * | 4/2017 | Ronning ............... A01M 29/10 |
| 2017/0164603 A1 * | 6/2017 | Kovarik et al. ....... A01M 29/10 |
| 2018/0194487 A1 * | 7/2018 | Flynn et al. ........... B64D 45/00 |

* cited by examiner

AIRCRAFT LIGHTING SYSTEM

TECHNICAL FIELD

The present invention is an aircraft lighting system. In particular, the present invention is directed to an aircraft lighting system with light that is directed toward an aircraft's engines to deter bird strikes.

BACKGROUND ART

A current problem in the aviation industry is the incidence of bird strikes on aircraft. It has been estimated that these incidents cost the airline industry $1.2 billion dollars annually in losses, delays and cancellations. On average, each bird strike costs an airline approximately: $40,000. This total does not include bird strike losses to helicopters or general aviation or military aviation.

Military losses in western nations are difficult to estimate. However, between 1959 and 1999, at least 283 military aircraft were lost due to bird strikes including 141 deaths. Today, aircraft use larger engines with very high by-pass ratios. Aircraft engine frontal surfaces have increased considerably over older ones. This makes aircraft engines more susceptible to bird ingestion. Moreover, engines have to be designed to withstand bird strikes. This has necessitated the installation of heavier engine components. Accordingly, the additional weight causes higher fuel consumption and creates more pollution into the upper atmosphere.

Airports and their municipalities bear the majority of the cost of bird strikes. Airport wildlife management costs can exceed $100,000 per year. The airlines and aircraft manufacturers that benefit from the implemented measures to reduce bird strikes have not contributed adequately to minimize the occurrence of these incidents. Accordingly, an aircraft lighting system is needed that can reduce or eliminate bird strikes without imposing a heavy financial burden on the airlines or airports.

SUMMARY OF THE INVENTION

The present invention is an aircraft lighting system. In particular, the present invention is directed to an aircraft lighting system with light that is directed toward an aircraft's engines to deter bird strikes. The lighting system for a jet-powered aircraft has at least one light mounted on an aircraft fuselage aimed at an engine inlet of an engine nacelle of the aircraft. The illumination from the light comprises ultraviolet light between 300 and 400 nm in wavelength and the light flashes at a pre-determined frequency preferably between 1 and 3 Hz. Additional lights can be mounted on the engine nacelles to illuminate outer engine nacelles. Preferably, the engine of the aircraft also has blades coated in fluorescent or iridescent paint to increase the reflectivity of the blades to further illuminate the blades of the engine. The lighting system preferably automatically illuminates the engine inlets during take-off and descent.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2c is a closer detailed view of FIG. 2a;

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an aircraft lighting system.

Even on sunny days, engine inlets, particularly fan blades, are often partially obscured. Typically, only an outer lip of the engine inlet is made of light colored metal (e.g. aluminum) and is clearly visible.

Generally, the present invention comprises strategically installed lights on aircraft to illuminate its entire engines inlets. Thus, the lights make the engine inlets, particularly the rotating fan blades, more visible to birds. Given that sound travels at approximately 300 msec. in air and light travels at approximately 300,000,000 m/sec. (or 1 million times faster), this discrepancy can be used to visually alert birds of an in-coming aircraft with light much more rapidly than sound. Birds generally have keen eyesight and an engine inlet that is more easily visible to birds will result in an increased chance of being avoided than a dark engine inlet. Airport environments are typically very noisy due to various aircraft activities as well as the movement of ground support equipment. Birds will be able to quickly associate the sound source of a particular aircraft with the light emissions of the present invention and clearly identify the location of the aircraft engine inlets and avoid them.

Existing aircraft landing, anti-collision and navigation lights are not sufficient or large enough to prevent bird strikes on aircraft, particularly engine inlets. The present invention can be mounted on an aircraft fuselage and its engine nacelles to aim focused beams of light through lenses towards the aircraft's engine inlets.

Figure 1A:
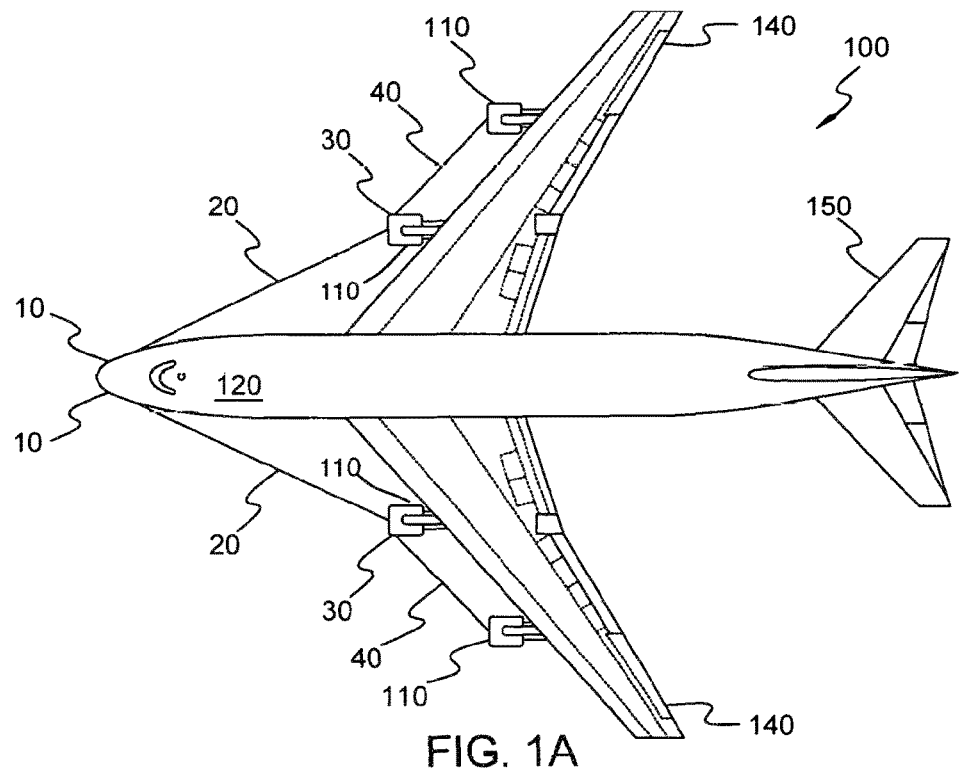
FIG. 1a is a top view of a schematic showing a preferred embodiment location of lights positioned on the fuselage and engine nacelles of a jet with lines depicting light cast.
Figure 1B:
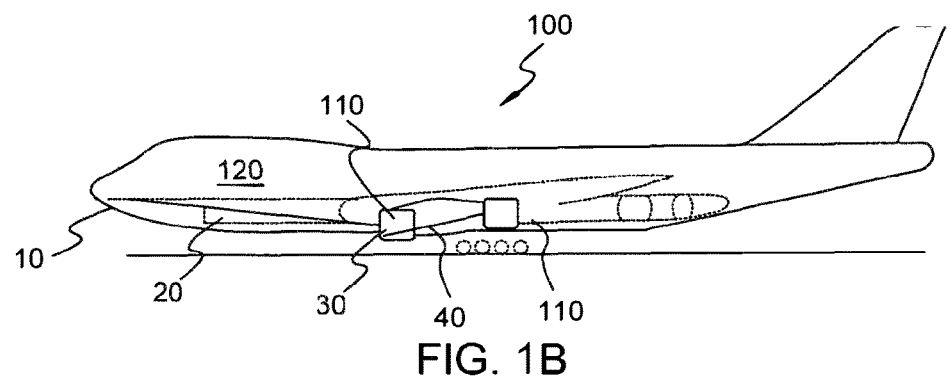
FIG. 1b is a side view of a schematic showing a preferred embodiment location of lights positioned on the fuselage and engine nacelles of a jet with lines depicting light cast.
Figure 1C:
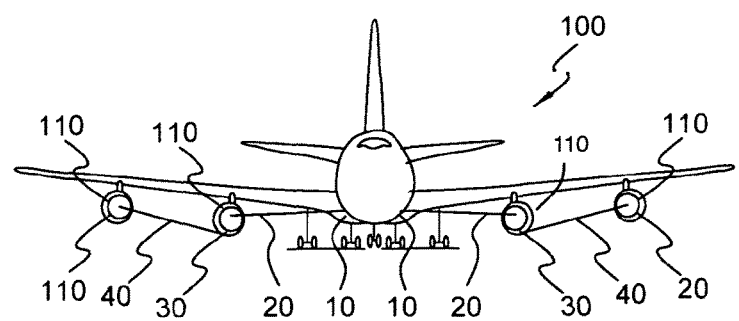
FIG. 1c is a front view of a schematic showing a preferred embodiment location of lights positioned on the fuselage and engine nacelles of a jet with lines depicting light cast.

Referring now to FIG. 1a, a four engine jet aircraft 100, namely a Boeing 747, is shown. The aircraft 100 has four engine nacelles 110. In the preferred embodiment shown in FIG. 1a, lights 10 are mounted on the fuselage 120 of the aircraft 100 and aimed at the engine nacelles 110 as shown by rays 20. Nacelle lights 30 are also preferably mounted on the interior engine nacelles 110 to shine on the outer engine nacelles 110 along rays 40. FIG. 1b shows a side view and FIG. 1c shows a front view of this arrangement.

Figure 2A:
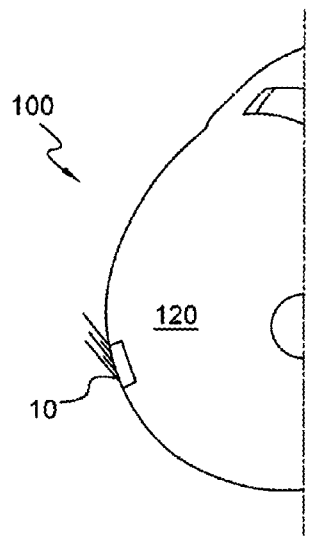
FIG. 2a is a side view schematic of a preferred embodiment light installation on a jet fuselage.

Referring now to FIG. 2a, a preferred embodiment of the fuselage lights 10 mounted on the aircraft fuselage 120 is shown. Preferably, the lights 10 are mounted flush with the fuselage 120 and flash periodically on the engine inlet of the engine nacelle 110 (not shown).

Figure 2B:
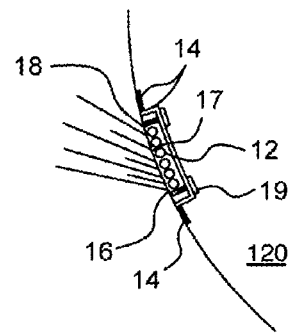
FIG. 2b is a side perspective view schematic of a preferred embodiment light installation on a jet engine nacelle.
Figure 2C:
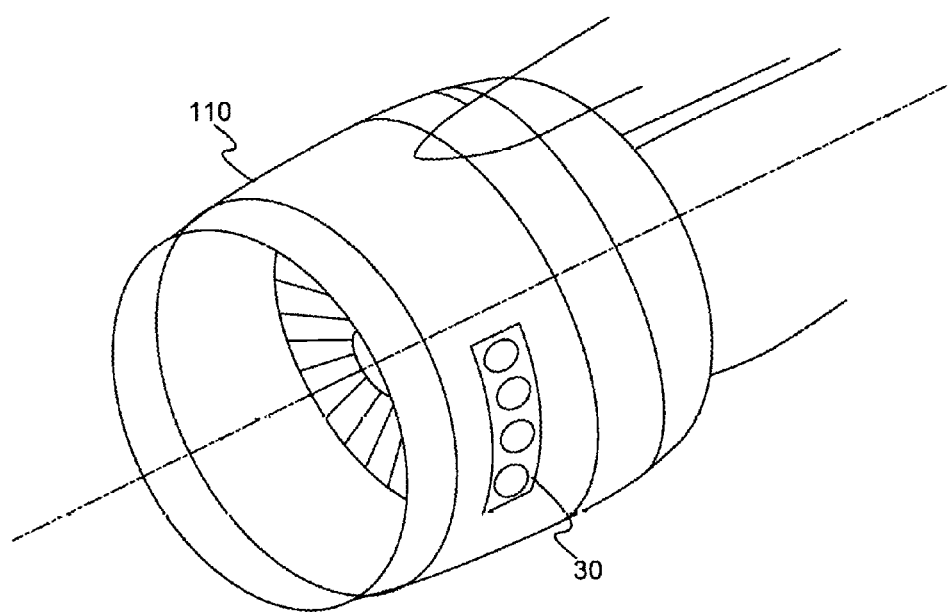

Referring now to FIG. 2c, a preferred embodiment of the nacelle lights 30 mounted on the exterior of an engine nacelle 110 is shown. Preferably, the nacelle lights 30 are mounted flush with the nacelle 110 and flash periodically on an exterior engine nacelle 110 (not shown). In the preferred embodiment shown in FIG. 2b, the nacelle lights 30 shown are four light-emitting diodes (LEDs). However, as shown below, other lights such as Xenon gas lamps can be used.

Referring now to FIG. 2b, a closer view of a preferred embodiment of the fuselage lights 10 mounted on the aircraft fuselage 120 is shown. Preferably, the fuselage lights 10 are mounted flush on the fuselage 120. The fuselage light 10 preferably comprise LED bulbs 12 mounted inside a frame 14 on the fuselage 120. Preferably, a perforated plate 16 and glass panel 18 cover the LED bulbs 12 and are attached to the frame 14 by bolts 19. The perimeter of the light assembly 10 is preferably made water and weather resistant by a seal 17. The seal 17 is preferably a rubberized seal suitable for the aircraft environment such as the type used as an anti-ice precaution on the leading edges of aircraft wings.

Figure 2D:
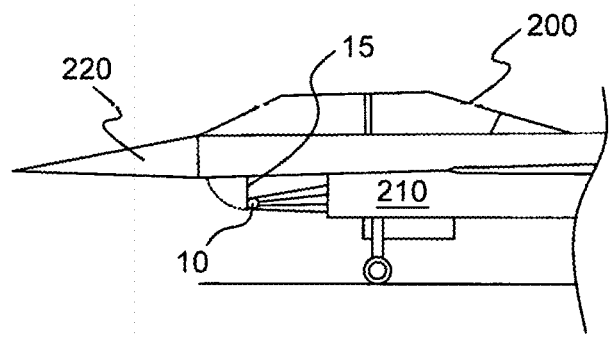
FIG. 2d is a side view schematic of a preferred embodiment installation of retractable light installation on a smaller jet aircraft.
Figure 14:
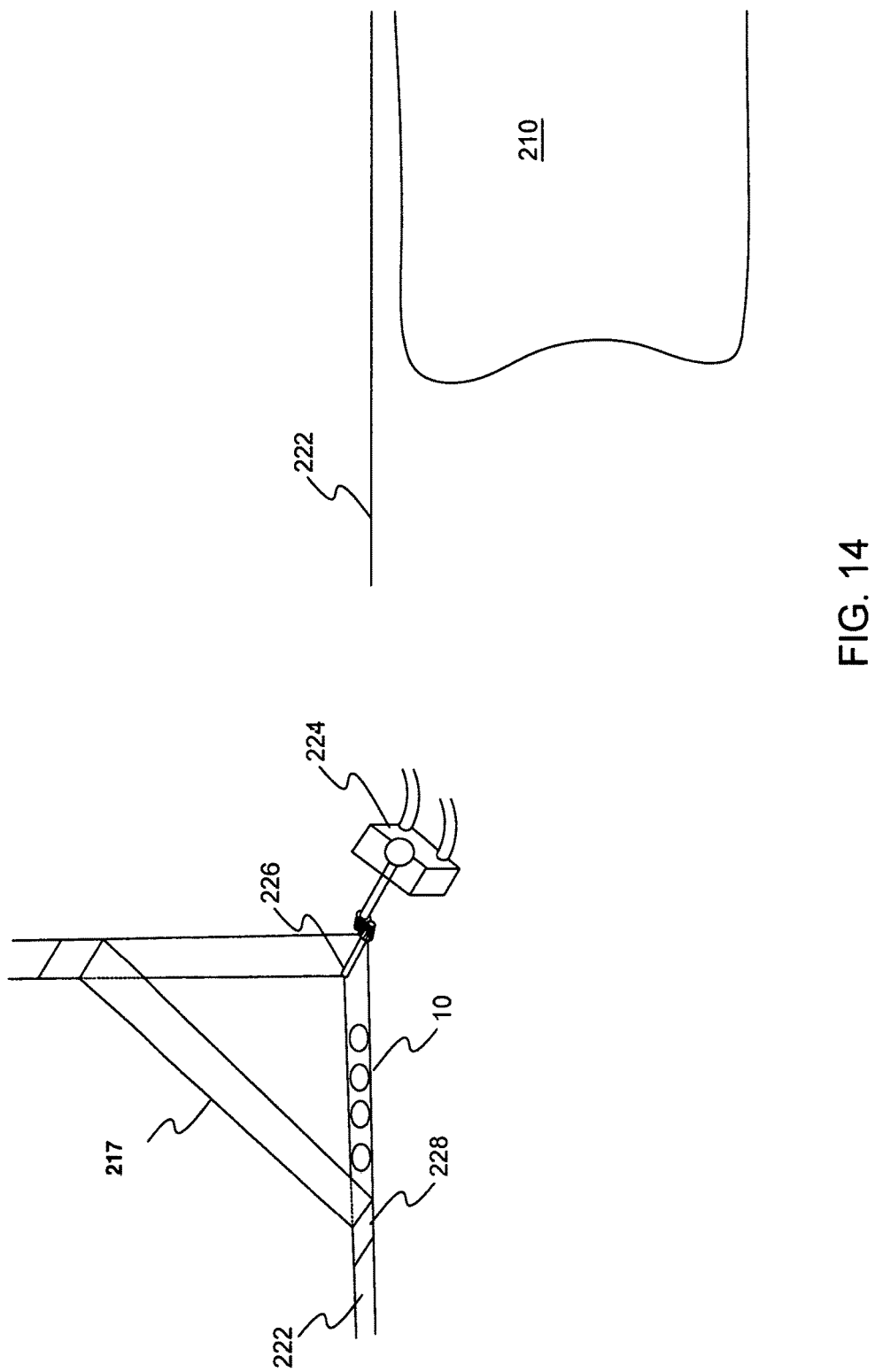
FIG. 14 is a side perspective view of a preferred embodiment of a retractable arm assembly for the present invention in a retracted position.
Figure 15:
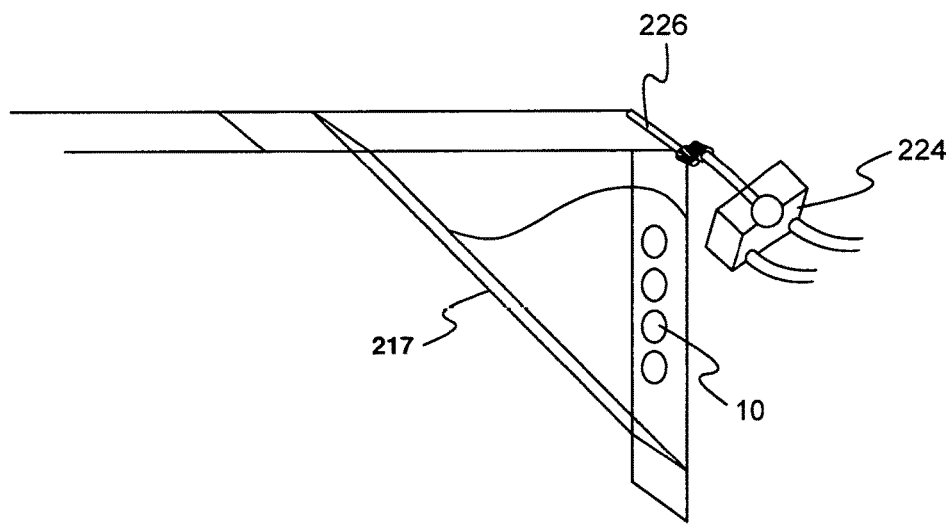
FIG. 15 is a side perspective view of a preferred embodiment of a retractable arm assembly for the present invention in a deployed position.

Referring now to FIG. 2d, an alternate embodiment of the present invention is shown installed on a smaller jet 200, such as a military fighter jet. The embodiment shown in FIG. 2d can be used when the distance between the light 10 and the engine 210 is not sufficiently large. The lights 10 are preferably mounted on a retractable arm 15 that is preferably only extended during take-off and landing phases or as required by a pilot. A preferred embodiment of the retractable arm assembly is shown in FIGS. 14 and 15. When retracted, the arm 15 is preferably held inside the floor 222 of the fuselage 220 and seal 228. Preferably, an electric motor 224 (controlled in the cockpit) drives gears and bearings 226 and is used to raise and lower the assembly comprising the arm 15, lights 10 and support arm 217.

Figure 2E:
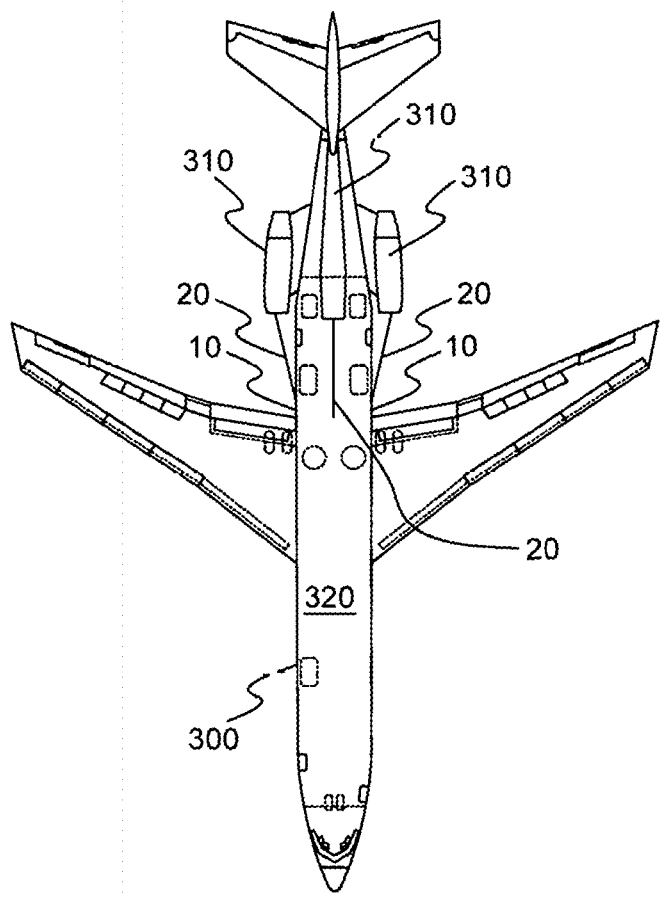
FIG. 2e is a top view schematic of a preferred embodiment installation on a rear engine aircraft with lines depicting light cast.

Referring now to FIG. 2e, an alternative embodiment of the present invention is shown for use on planes 300 with rear engine nacelles 310, such as the Boeing 727 shown. Lights 10 are preferably mounted on the fuselage 320. The lights 10 preferably periodically flash on the inlets of the engine nacelles 310 along rays 20 shown.

Figure 3:
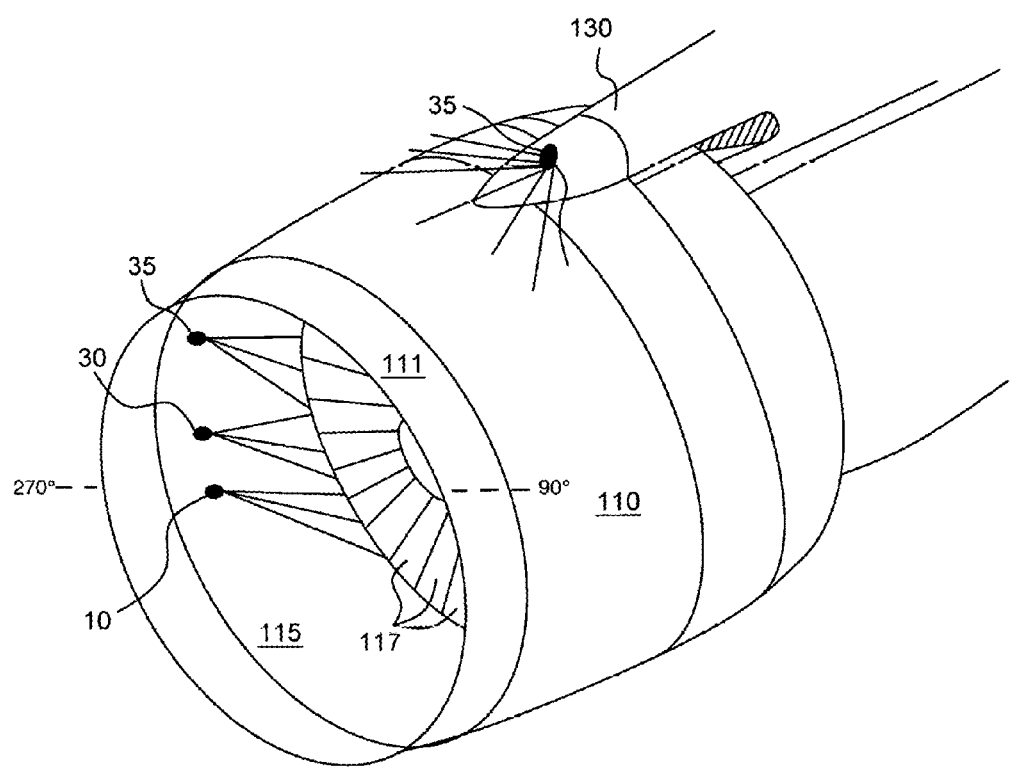
FIG. 3 is a front perspective view schematic showing preferred embodiment locations of lights positioned inside an engine inlet and on the engine pylon with lines depicting light cast.

Referring now to FIG. 3, nacelle lights 30 can alternatively be positioned inside an engine inlet 115. As shown in FIG. 3, the lights 30 are preferably mounted on a colder section of the inlet 115 that is not a source of ignition. The lights 30 are preferably mounted flush with the inlet 115 so as not to interfere with the flow of air into the engine nacelle 110. The lights 30 are preferably angled to shine on fan blades 117 that rotate clockwise or counter-clockwise in the nacelle 110. A pylon light 35 can also, space permitting, be installed on an engine pylon 130 to flash forward on top of the nacelle 110.

Figure 4:
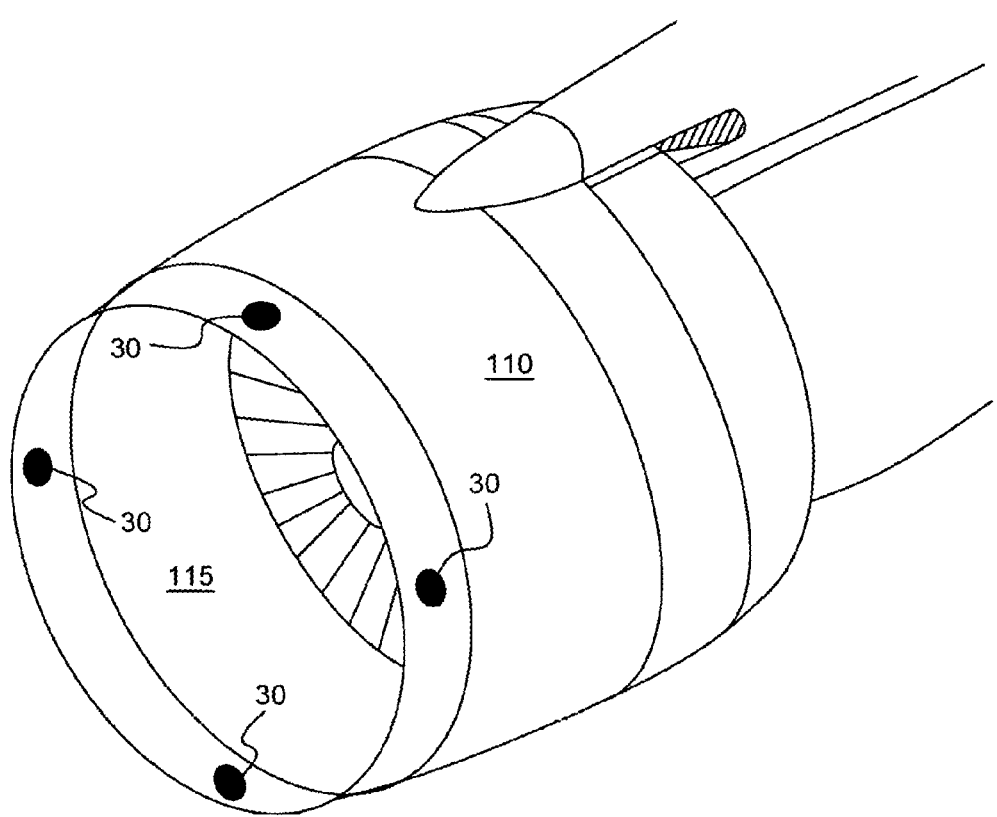
FIG. 4 is a front perspective view schematic showing an alternate embodiment locations of lights positioned inside an engine inlet.
Figure 7:
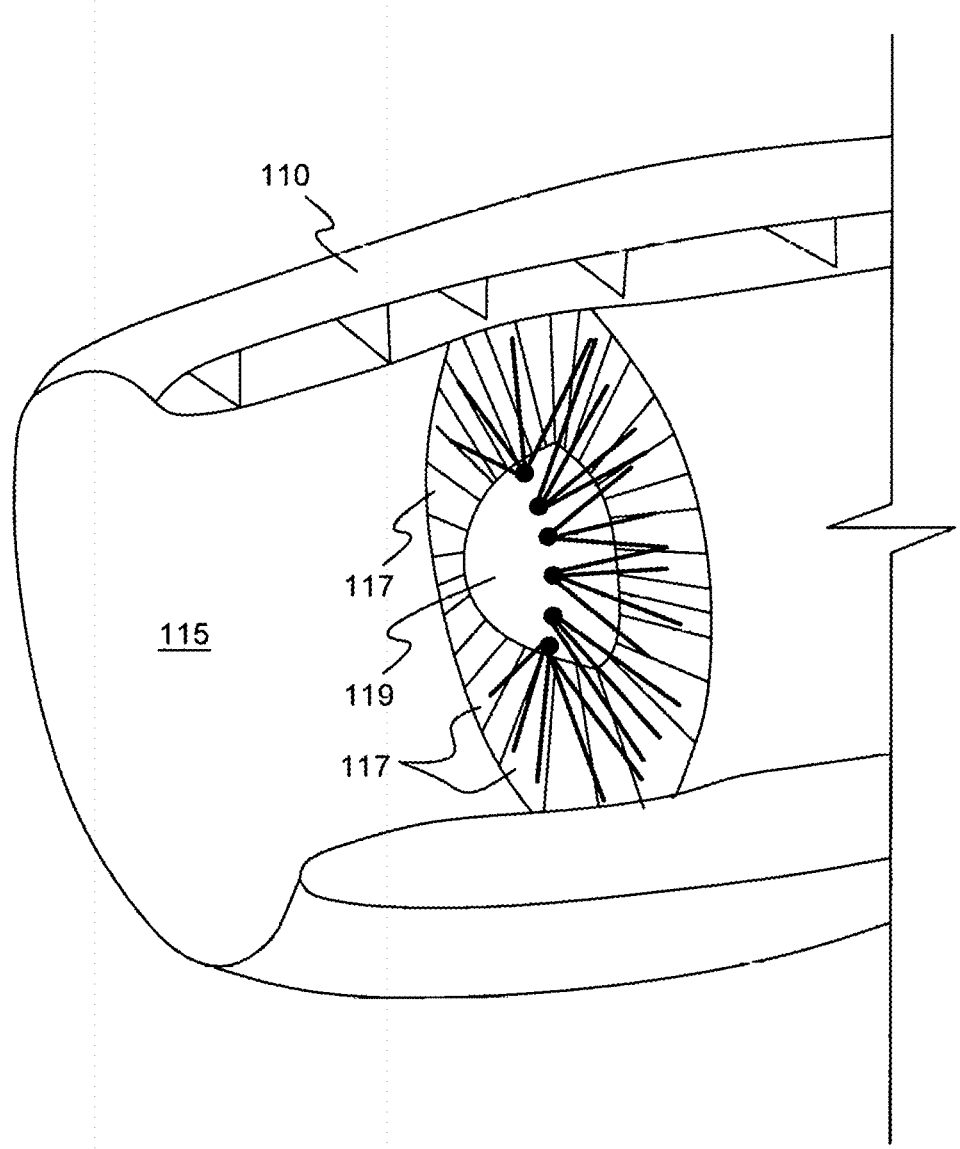
FIG. 7 is a side cross-sectional view schematic showing a preferred embodiment light installation on an engine nose cone.

Referring now to FIG. 4, an alternative embodiment of the present invention is shown. In FIG. 4, nacelle lights 30 can also be preferably installed flush around an engine inlet 115 as shown. Referring now to FIG. 7, another alternative embodiment is shown where nacelle lights 30 are preferably installed flush on the engine nose cone 119 (preferably under glass affixed thereto). The lights 30 shine on the fan blades 117 to illuminate the blades 117.

Typically, prior art aircraft lighting has outward shining aircraft lights installed on the airframe and outside the engine inlets. The present invention preferably has light installations that shine on engine inlets and fan blades to make the inlets and fan blades more visible to birds. While aircraft fuselages and wings can typically sustain bird strikes and continue to fly, an engine strike can impose tremendous thermal and structural stresses on the rotating fan blades, possibly damaging them or breaking them off, which will result in catastrophic failure that endangers the flight. Aircraft engines are typically the most vulnerable components of an aircraft to damage from bird strikes.

Preferably, the lights 10 and 30 will have varying flashing frequencies as a function of fan speed, as well as different color(s) and pattern(s) of projection. Research has shown that a varying flashing frequency from 0.1 Hz to 3.0 Hz is very effective to capture the attention of birds. The higher flashing frequencies heighten a bird's survival instinct and cause them to fly away from the aircraft. The maximum flashing frequency disclosed by this invention are preferably employed when the engine's are at take-off speed and the flashing rate of the lights is proportional to the fan speed of the engines. Alternately, the system can maintain the maximum flashing frequency as a constant when the lights are powered on, independent of the phase of a given flight, e.g. take-off, landing, or in-flight.

The lights 10 and 30 of the present invention, like prior art logo lights that illuminate the rudder of an aircraft, also make the fuselage 120, wings 140 and tail 150 more visible to birds and will reduce bird strike incidents. The lights 10 and 30 also will make the aircraft more visible to tower personnel and pilots of other aircraft on take-off or during approach to landing. This is accomplished without added risks of impacting the vision of other pilots or airport workers.

The present invention preferably does not present a significant weight penalty to the aircraft and does not impose a high electric load on the aircraft generation system. Aircraft utilizing this invention would typically have electric consumption levels on the order of 100-150 watts or less per light. This is much lower than prior art landing or logo lights currently installed on aircraft, typically rated at 400-600 watts each. The present invention will chiefly be used during the take-off and approach to landing phases of the flight, although they can be turned on/off at anytime. By mounting the lights flush with the engine inlet 115 or fuselage 120, the lights 10 and 30 will not cause parasitic drag on the airframe. The present invention can preferably be retrofitted to existing commercial and military aircraft or incorporated directly into the construction of future aircraft.

Operation Regimes

The present invention has a number of preferred methods of operation. Typically, the flight of an aircraft has different phases, e.g. departure or take-off in-flight; and descent, approaching to landing, and landing.

Method 1:
On Departure:
a. Lights illuminate in steady state or solid when engines are powered on. Lights then become stroboscopic to synchronize with the fan speed of the engines (N1) after engine start.
b. Lights remaining powered on and stroboscopic until the aircraft's flaps are completely retracted.
On Descent:
a. Lights illuminate when cabin pressurization decreases to a pre-determined level and remain illuminated until engine shut-down. When illuminated, lights are preferably synchronized to N1.
b. If the flight is forced into a "go-around" or "touch and go" situation, lights stay illuminated until flaps are retracted completely.

Method 2:
On Departure or Descent:
a. Lights illuminate when powered on via a dedicated cockpit switch, e.g. on take-off and/or landing, by cockpit crew as part of a pre-determined checklist. When powered on, the lights preferably are synchronized to N1.
b. The lights can then be turned on or off by the cockpit crew at any point in the flight, e.g. a pre-determined altitude as set by a checklist.

Method 3:
On Departure:
a. At push back and taxi, the lights are preferably off. When take-off roll begins, the lights illuminate and begin flashing when N1 exceeds 75% of maximum or when the engines are set to "take-off" power. The lights preferably remain illuminated and flashing until the aircraft climbs through 10,000 ft above ground level ("AGL") or any other altitude selected by an operator. The lights are powered off automatically upon reaching the pre-determined altitude.
On Descent:
b. Upon descent below 10,000 ft AGL (or any other altitude selected by operator), the lights illuminate and stay illuminated and flashing until touch down on the runway. The lights can be powered off automatically at brake application or by a landing gear compression sensor. The lights then preferably remain off even if engine power is increased due to the deployment of the thrust reversers.

Description of Lights and Installation of Lights in Engine Inlets and Fuselages

Referring now back to FIG. 3, nacelle lights 30 can be positioned as single or multiple rows anywhere inside the engine inlet 115, ahead of the fan blades 117 and on or behind the fan case lip 111 in order to shine on fan blades 117 and other inner surfaces of the engine inlet 115, e.g. engine cones. However, preferably, the ideal arc is from 270 deg. to 90 deg. where clockwise is measured from 0 deg. at top center of the engine inlet 115. This half circle allows flexibility in positioning the lights 30 in order to avoid ducts and wiring (not shown) behind inner surfaces of the engine inlet 115. Additionally, locating lights 30 in this arc will help avoid damage from steps, ice, snow, FOD (Foreign Object Damage) and sand.

Preferably, when the lights of the present invention are illuminated, they are flashed. The flashing frequency is preferably governed by the engine speed, e.g. N1. For example if N1 is 3600 RPM, the lights (e.g. 10, 30, or 35) can be made to flash once every 30 revolutions of the fan blades 117. Thus, the lights flash at two flashes per second or a flashing frequency of 2 Hz. The lights' flashing frequency can also preferably be set manually using a frequency control as required. Alternatively, flashes from individual rows of lights can be made to occur separately from other rows or simultaneously.

Figure 5A:
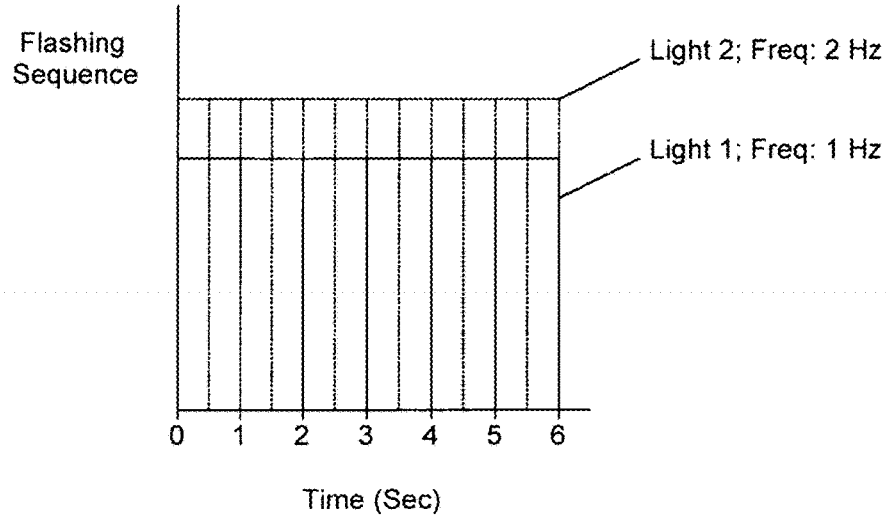
FIG. 5a is a schematic depicting a preferred embodiment flashing sequence overlap of 2 lights at 2 Hz.
Figure 5B:
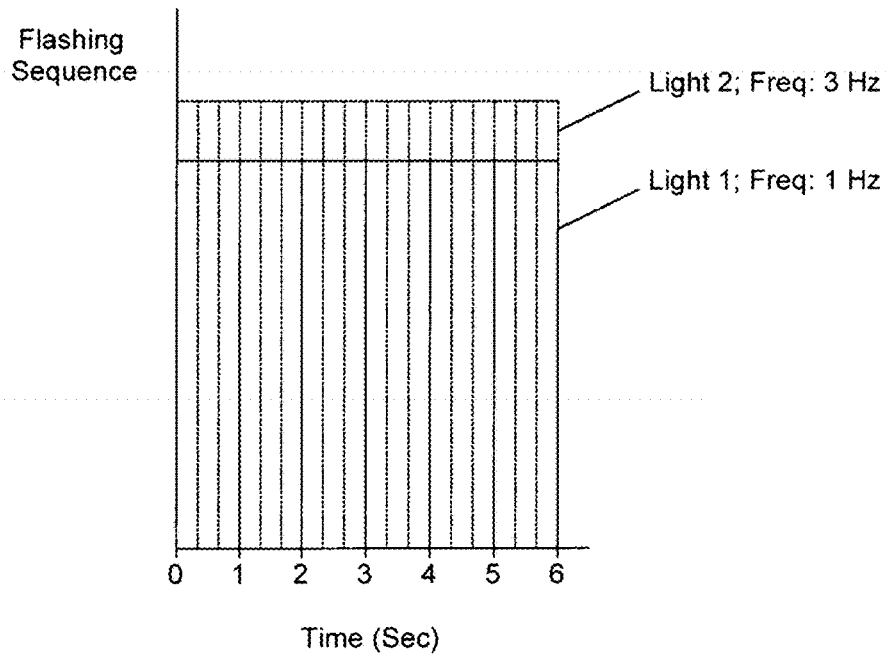
FIG. 5b is a schematic depicting a preferred embodiment flashing sequence overlap of 2 lights at 3 Hz.

The lights of the present invention (e.g. 10, 30, 35, etc.) can have different colors and hues, e.g. orange (590 nm) and violet (400 nm) or white and violet. These colors/hues can be alternating or fixed in nature. An illumination or flashing sequence of the lights is preferably such that the flashes of different lights overlap for a fraction of a second with one another in order to avoid periods of darkness. Referring now to FIG. 5a, a graph of a preferred illumination or flashing sequence is shown with lights flashing at 1 Hz and 2 Hz Respectively. Referring next to FIG. 5b, a graph of another preferred illumination sequence is shown with lights flashing at 1 Hz and 3 Hz respectively. The periodic overlap of illuminated lights increases the light intensity, which has been proven to better capture the attention of various birds.

The lights of the present invention (e.g. 10, 30, 35) can be similar to anti-collision strobe lights presently in aviation use. Preferably, the lights are xenon gas lights or LEDs. For example, LEDs have lower energy consumption than incandescent lamps and generally longer service lives. The lights preferably use LED bulbs. An incandescent 150 W light generally produces 2600 lumen whereas an LED light that produces 2600 lumen generally consumes only 25-28 W. Also, LED lights typically begin emitting light faster than incandescent lights. The lights preferably generate ultraviolet light (UV) in the spectral region of 180-400 nanometers (nm). This range of wavelengths is preferred to increase the visibility of the aircraft for birds, as many birds have a maximum absorbance of UV light at a wavelength of 370 nm.

Preferably, fan blades 117 and nose cones 119 (such as in FIG. 7) are painted different colors (including fluorescent and iridescent) to increase visibility when illuminated with the lights (10 or 30) of the present invention. The chosen type of paint must be applied in such a way not to alter the balance of the fan disks and balance should be maintained.

Visual Ecology of Birds and Humans

Figure 10:
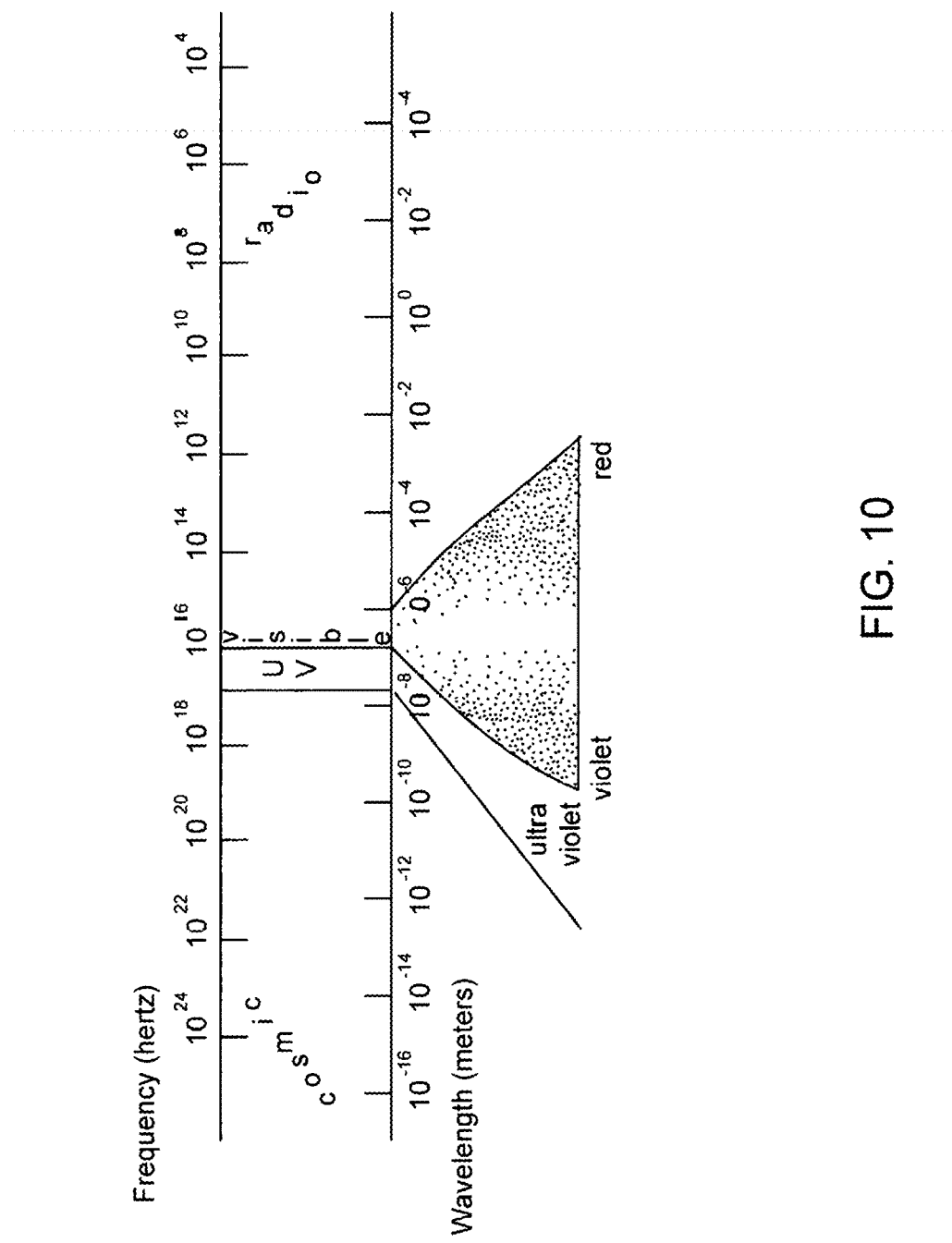
FIG. 10 is a diagram showing the wavelength and frequency distribution of ultraviolet light seen only by birds compared to visible light seen by humans.

Birds are better able to see ultraviolet light than humans. FIG. 10 is a chart showing the UV portion of light spectrum only visible to birds and generally beyond normal human perception. Typically, avian ocular media do not absorb UV light before the light reaches the retina. The majority of birds have either a violet-sensitive single cone that gives them sensitivity to UV wavelengths or a single cone that gives them maximum sensitivity to UV wavelengths. Birds generally employ the perception of UV light in various visual tasks. A bird's violet/UV cone typically allows it to see objects reflecting UV light brighter when used in an achromatic task (brightness) such as seeing an approaching aircraft. Similarly, in a chromatic task (colors), birds can usually discriminate spectral stimuli according to the amount of reflective light in the UV part of the spectrum relative to the longer wavelength. This ability allows many bird species to differentiate amongst colors such as aircraft lights.

Figure 11:
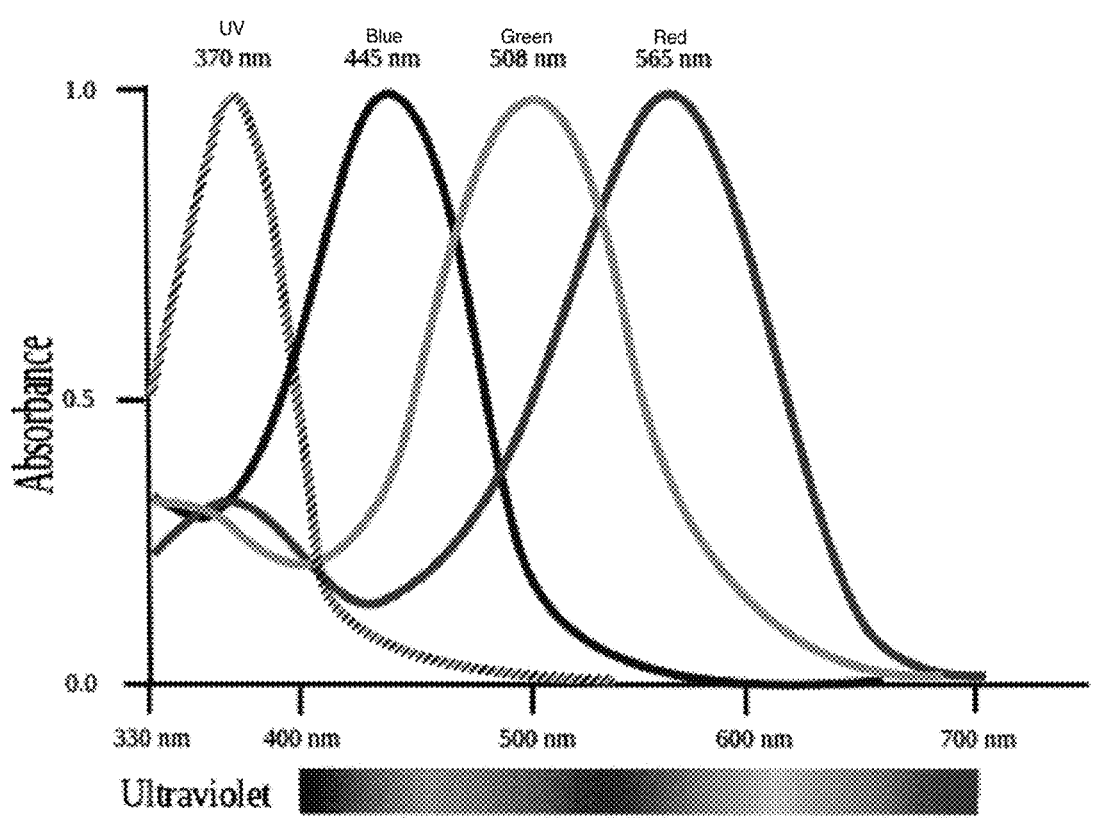
FIG. 11 is a graph that shows ultraviolet light absorbance of birds' vision.

Humans usually have three different types of single cone photoreceptors each containing a different photo pigment that is either: short (SWS), medium (MWS) or long wavelength (LWS) sensitive. Thus, humans generally need three primary colors to identify any particular color and are said to be "tri-chromatic." Most birds, by contrast, have a fourth spectral type of single cone and, therefore, require four primary colors to identify any particular color. This is referred to as "tetra-chromatic." Each one of a bird's four cones has a distinctive maximal absorption peak. The fourth cone either has peak sensitivity in violet wavelengths and has considerable sensitivity in the near ultraviolet (UVA, 320-400 nm) region (VS cone: violet sensitive) or has maximum sensitivity in the UVA region (UVS cone: ultraviolet sensitive). The chart in FIG. 11 shows the common absorbance capability of avian vision including the UV part of the spectrum. Practical LED lights have efficiencies to produce UV lights in the ultraviolet range of 365 nm to 395 nm varying between 5-20%. Special LED lights that have a higher efficiency to emit light in the ultraviolet range can also be produced.

Furthermore, whereas average humans have about 200,000 receptors per $mm^2$ of retina, average birds, e.g. the house sparrow, have more than 400,000 receptors per $mm^2$ of retina. This receptor density can vary as the common buzzard has 1,000,000 receptors per $mm^2$ of retina. This increased density of avian photoreceptors evidences the excellent visual acuity of most birds. Thus, the lights of the present invention (10, 30, 35) preferably generate UV light to make aircraft more visible to birds.

Lighting Details and Other Applications

The lights of the present invention preferably have a voltage rating compatible with the typical voltage for jet-powered aircraft, namely 25 volts. The lights (10 or 30) of the present invention preferably are able to withstand extreme changes in ambient temperature, pressure and local vibrations. This is commonly achieved by using aeronautically approved material in use today in aviation.

Figure 6:
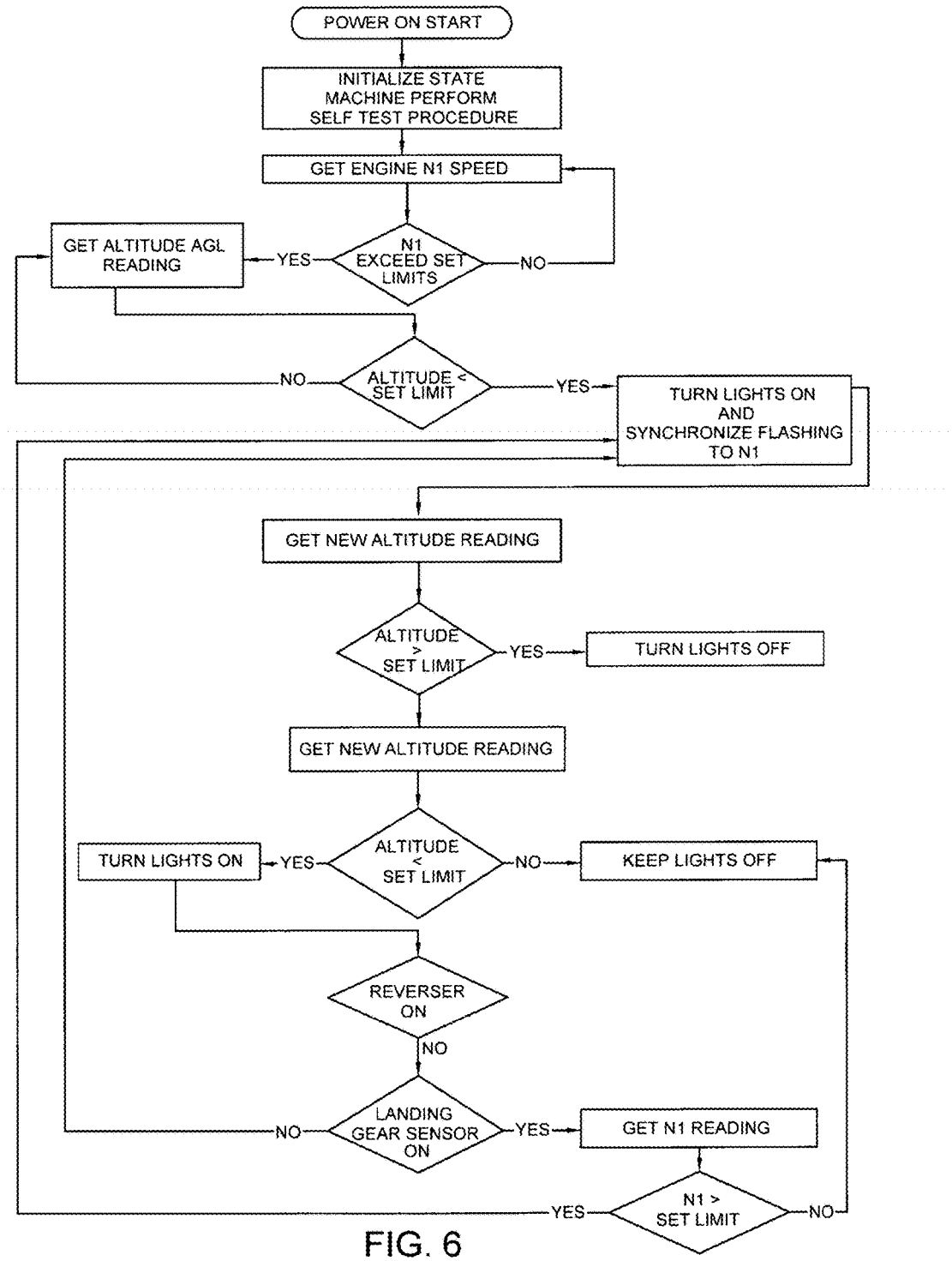
FIG. 6 is a block diagram depicting a preferred sequence for turn-on and turn-off control of the lights.

Referring now to FIG. 6, a flow chart depicting a preferred command sequence for the present invention is shown. It presents the conditions at which the lights (10 or 30) are turned on and the criteria necessary for them to stay on or turn off. The flowchart in FIG. 6 also shows conditions that will trigger the lights (10 or 30) to stay on in case of a "touch and go," a rare occasion in airline operation but useful in flight crew training or general aviation and military transport.

Engine speeds, N1 and N2, are commonly detected in jet aircraft. N1 typically refers to the speed of the low-pressure compressor or fan speed and N2 typically refers to the speed of the high-pressure compressor or engine core. The engine speed and altitude limits are left to the operators to choose, as there are generally no established rules for operation that can serve all conditions. Instead, the limits can vary based on the types of missions flown by the aircraft. For example, the limits of engine speeds may be high for airline and military operations due to the heavy payloads typically carried by those aircraft. Conversely, engine speeds can be lower for general aviation where business jets fly at considerably lower payloads than their maximum capabilities.

Similarly, the altitudes limits are dependent to a great extent on type of operation and geographical locations. For example, an aircraft that operates primarily in tropical regions where there is an abundance of birds in the vicinity of airports may need to have a higher altitude limit to protect against bird strikes from birds of different species, e.g. bird species that fly close to the ground and those that fly at higher altitudes. For aircraft that operate mostly out of desert environments where birds are more rare near airports, a lower altitude limit can be used.

Figure 8:
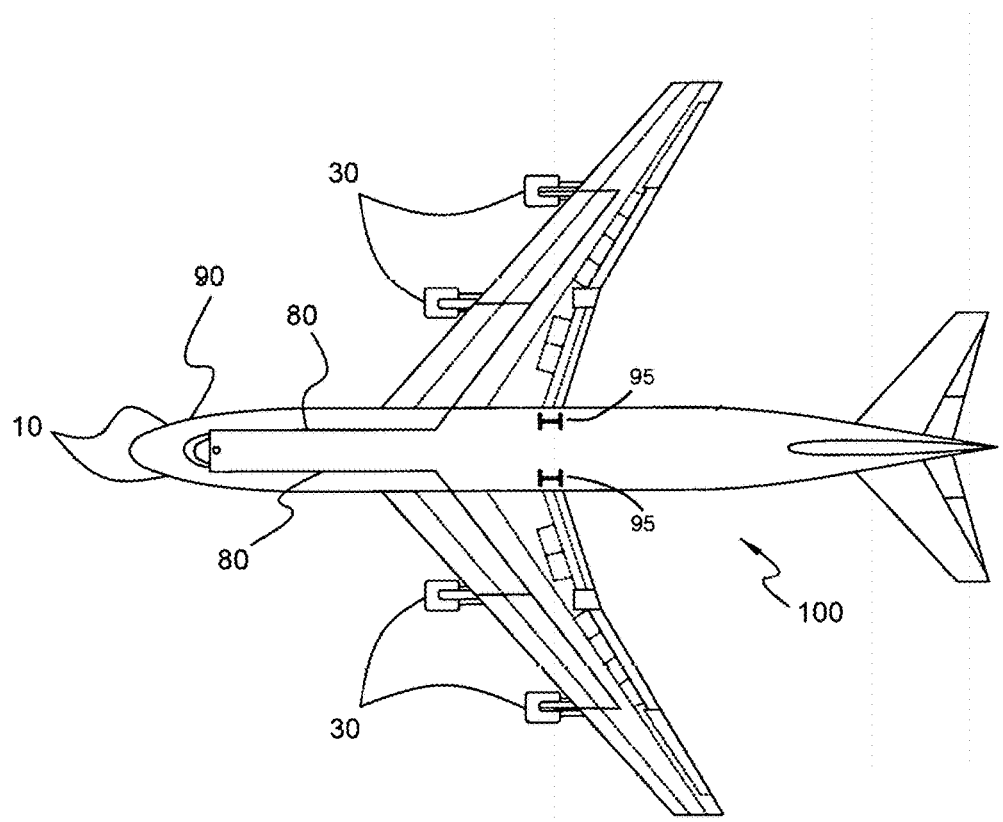
FIG. 8 is a top view schematic of a preferred embodiment electrical installation of the lights and controls.

Referring now to FIG. 8, a top view of a Boeing 747 is shown with a preferred wiring schematic for the present invention. As shown, the fuselage lights 10 and nacelle lights 30 are preferably connected by wires 80 to a control panel and switches 90 in the aircraft cockpit. The lights 10 and 30 are also preferably connected to landing gear sensors 95. The sensors 95 preferably detect compression of an aircraft's landing gear at landing (not shown), which will trigger the lights 10 and 30 to turn off and keep them in that state should an aircraft's thrust reversers be deployed to slow the aircraft down. In the rare case of a "touch and go," the thrust reversers would generally not be deployed. Accordingly, in this situation because N1 is above the set limit, the lights 10 and 30 will stay activated until the aircraft reaches a pre-set altitude where the lights 10 and 30 would be deactivated.

Figure 9:
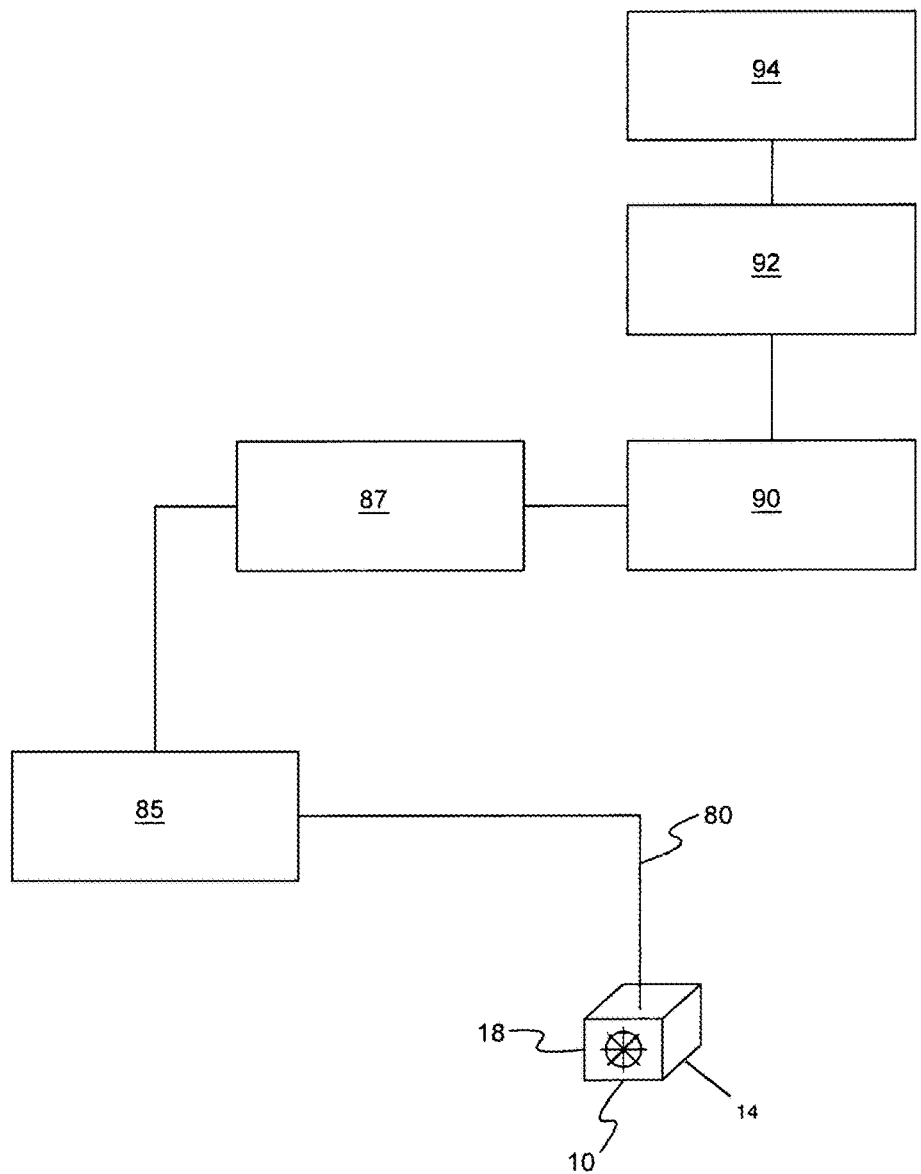
FIG. 9 is a block diagram of preferred embodiment of the electrical system.

Referring now to FIG. 9, a simple schematic of a preferred embodiment of the present invention connected to an aircraft's electrical system is shown. As aircraft models generally vary in design, a generalized schematic that identifies common components is shown. As shown in FIG. 9, a fuselage light 10 with a focusing lens is mounted to the aircraft, preferably behind a glass panel 18 and a perforated plate 16 (shown in FIG. 2*b*) in an enclosure frame 14. The light 10 is preferably connected by wiring 80 via an electric bus 85 and circuit breaker(s) 87 to a control panel and switches 90. The control panel and switches 90 are preferably in an aircraft's cockpit. Also, preferably connected to the control panel 90 are a flashing frequency control 92 and engine speed (N1) sensor 94. The landing gear sensors 95 can also be connected to the control panel to control the lights 10 and 30 as described above.

The lights of the present invention (10, 30 and 35) are preferably installed flush, and contoured, with the fuselage 120 and the surfaces of the engine inlet 115 under clear glass panels 18. Referring back to FIG. 2c, the glass panels 18 are preferably adequate for this application, e.g. shatterproof tempered glass or cockpit window glass. The glass panels 18 are preferably affixed to perforated stainless steel plates 14 or stainless steel, perforated plates 16 covering the bulbs 12. Aluminum plates of the type used in aircraft construction can also be utilized. Between the metal plate 16 and glass panel 18 is sandwiched a seal 17 preferably made of flexible rubberized material to withstand the harsh environment and vibration of aircraft engine operation. As shown in FIG. 2c, a one-piece stainless steel frame 14 preferably surrounds this preferred embodiment assembly and holds it together. For a fuselage application, the frame 14 is held in place by stainless steel screws 19 and washers similar to wing mounted landing lights. For the engine inlet installations as shown in FIGS. 3 and 4, the frame 14 whose edges extend behind the inlet 115 wall is secured to the back of that wall by bolts 19 and washers in a manner that will preclude the assembly from being sucked into the fan blades 117. Access to the lights 10 and 30 will take place by removing the retaining frame 14 in case of a fuselage installation or by opening the fan case in case of an engine inlet installation.

The glass panel 18 preferably protects the lights from outside elements and foreign object damage (FOD). The glass panel 18 should not fog or allow condensation to reach the bulbs 12 through the seals 17.

Figure 16A:
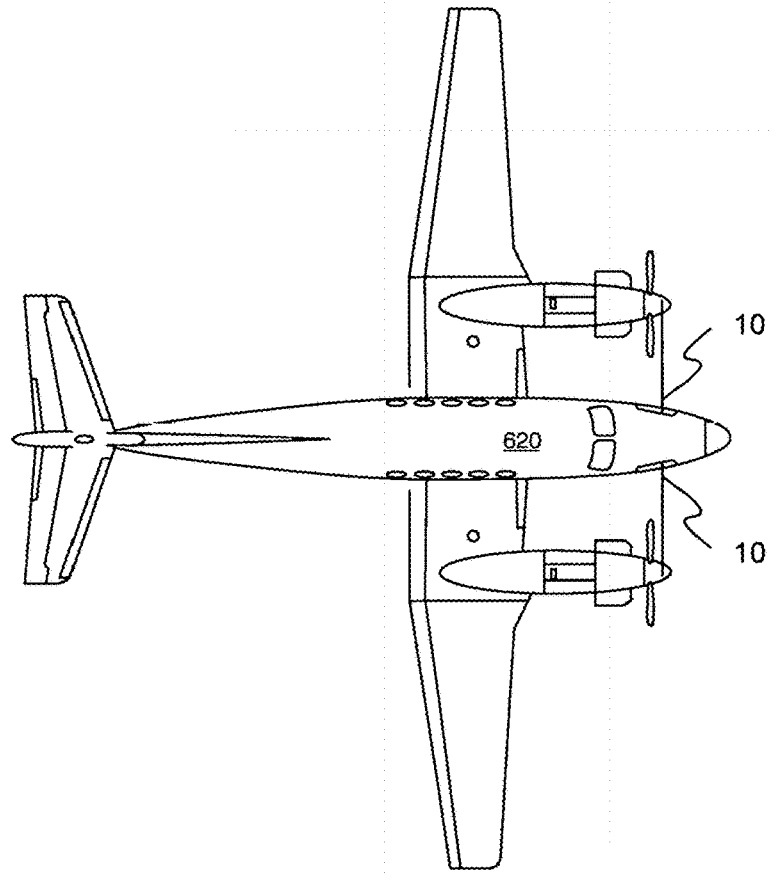
FIG. 16a is a top view of a preferred embodiment of the present invention installed on a twin engine propeller aircraft.
Figure 16B:
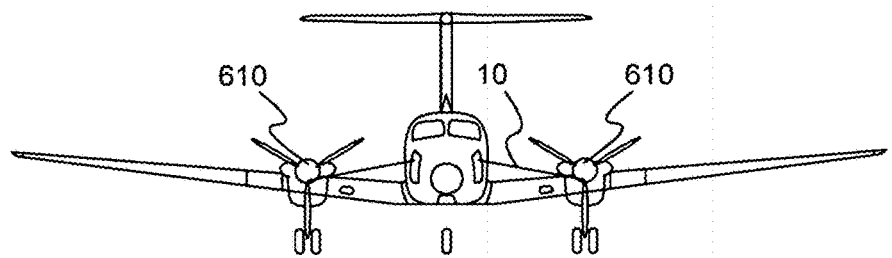
FIG. 16b is a front view of a preferred embodiment of the present invention installed on a twin engine propeller aircraft.

For propeller driven aircraft, engine cowl, pylon and fuselage (for twins) mounting are three possible installation alternatives proposed. Referring now to FIG. 16a, a common twin engine aircraft, a Beechcraft turbo propeller aircraft, is shown with the present invention installed. Fuselage lights 10 are mounted on the fuselage 620. A front view of the aircraft is shown in FIG. 16b. Preferably, the fuselage lights 10 are aimed at the bottom of the engines 610 to reduce reflection back into the cockpit of the aircraft.

Figure 17A:
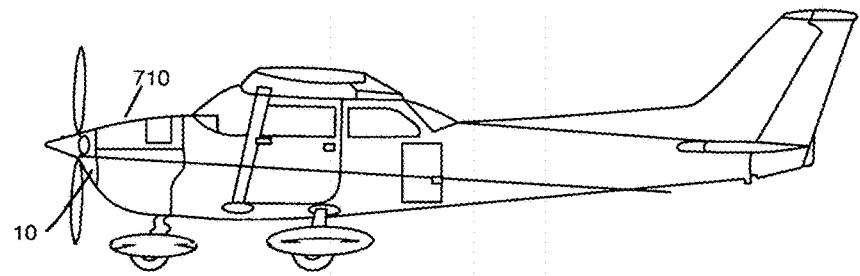
FIG. 17a is a side view of a preferred embodiment of the present invention installed on a single engine propeller aircraft.
Figure 17B:
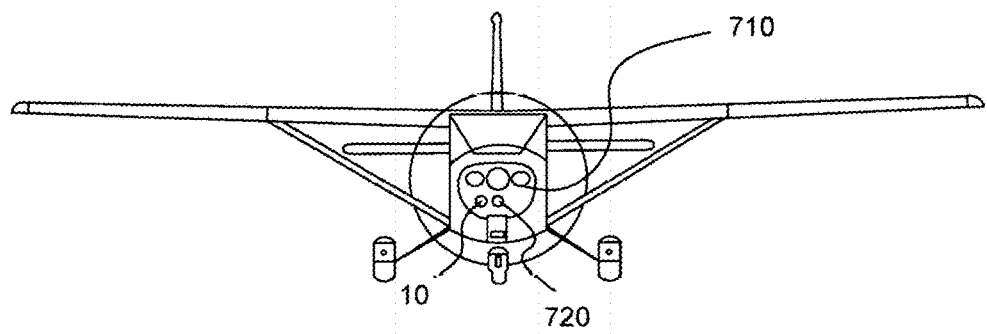
FIG. 17b is a front view of a preferred embodiment of the present invention installed on a single engine propeller aircraft.

Referring now to FIGS. 17a and 17b, a preferred installation of the present invention is shown for another common propeller aircraft with a single engine, a Cessna. As shown in FIG. 17a, a light 10 is shown mounted on the engine cowl 710. Preferably, the light 10 is mounted on the bottom of the engine cowl 710 to minimize reflection of light into the cockpit of the aircraft. Referring now to FIG. 17b, the light 10 is shown preferably mounted next to landing light 720 on the engine cowl 710.

Figure 18:
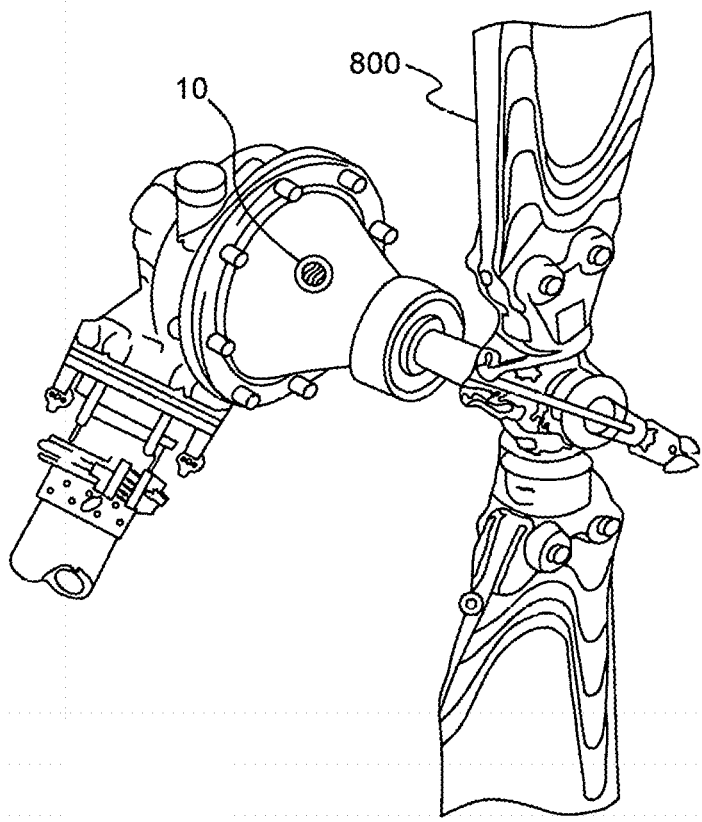
FIG. 18 is a side perspective view of a preferred embodiment of the present invention installed on a helicopter tail rotor; and, FIG. 19 is a side view of a preferred embodiment of the present invention installed on an unmanned aerial vehicle (UAV).

For helicopters, the lights are preferably mounted on the tail of the helicopter and flash on the rotor blades. Just as with jet engines, a bird strike can cause loss of control of the craft that can lead to catastrophic failure. The illumination of the rotor blades of the helicopter by the lights of the present invention reduces this possibility. Referring now to FIG. 18, a preferred installation of the present invention is shown on a helicopter tail rotor 800. The light 10 shines on the tail rotor assembly to alert birds.

As an operating methodology, aircraft and helicopters that normally operate at altitudes below 10,000 ft AGL preferably have the lights illuminated from engine start to shutdown automatically or by an override switch.

Figure 19:
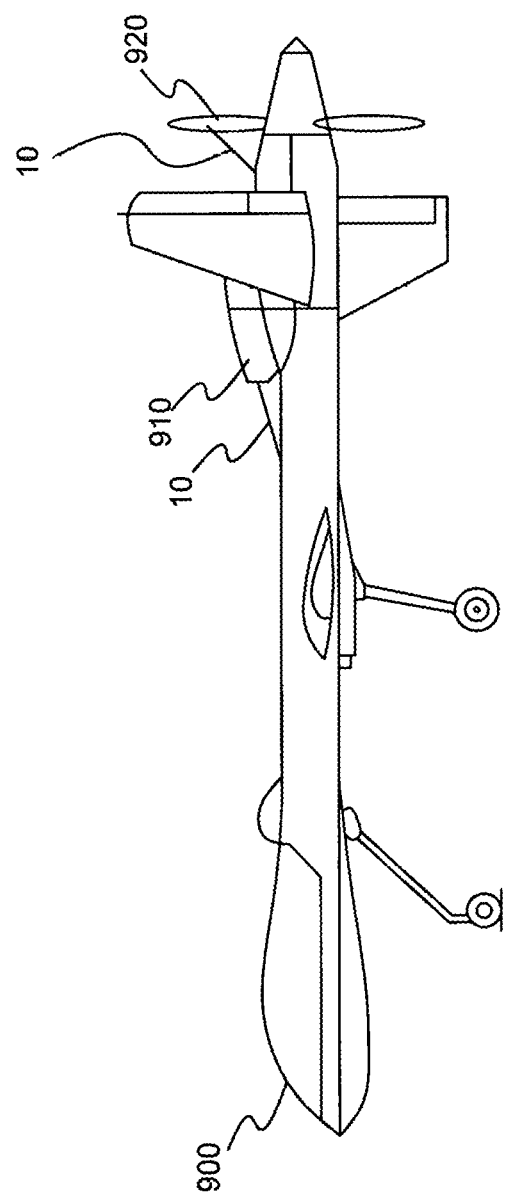

The present invention can also be installed on drones and Unmanned Air Vehicles (UAV) to illuminate the propellers and/or jet engines to reduce the possibility of bird strikes. Referring now to FIG. 19, a preferred installation of the present invention on a UAV is shown. As shown, lights 10 are preferably mounted on the UAV 900 in two locations, the engine inlet 910 and the UAV propellers 920, to alert birds.

Figure 12:
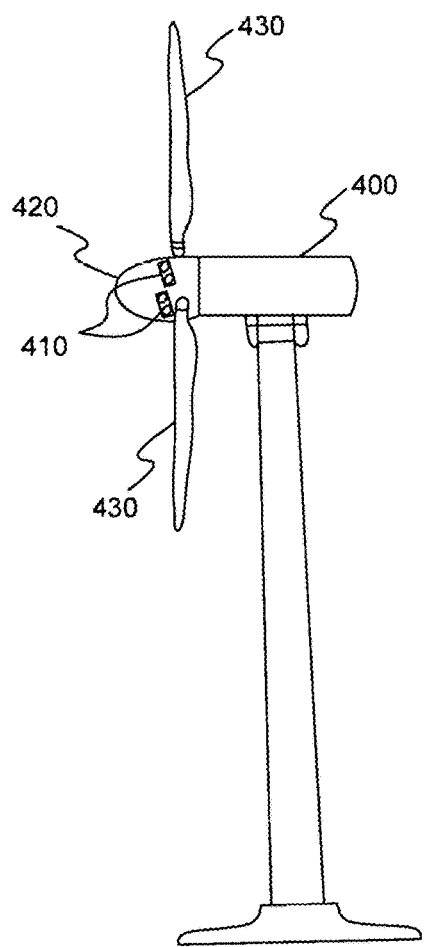
FIG. 12 is a side view schematic depicting a preferred embodiment of a flashing lights installation on a wind turbine hub.
Figure 13:
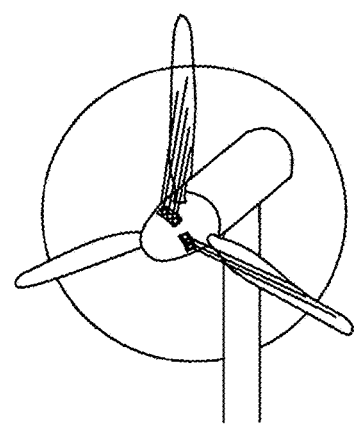
FIG. 13 is a front perspective view schematic depicting a preferred embodiment of the invention with a row of flashing lights to compensate for variable blade pitch with a circle depicting blade path.

Referring now to FIGS. 12 and 13, an additional non-aviation application is disclosed. As shown in FIGS. 12 and 13, the present invention can be mounted on a wind turbine 400. Preferably, lights 410 are installed in a radial layout on a hub 420 of the wind turbine 400. By mounting lights 410 on the hub 420, light can illuminate blades 430 even when the blades have variable pitch. Similar to the aircraft installation of the present invention, lighting the blades 430 with the lights 410 will make blades more visible, and therefore more avoidable, for birds. This reduces the incidence of bird strikes.

The flashing frequency of the lights 410 is preferably governed by the turbine's speed. The flashing frequency is preferably set between 2 Hz to 3 Hz at the highest allowable turbine rotational speed. Just as in the aviation application described above, the lights 410 overlap in flashing to avoid a dark state and in order to heighten the attentiveness of the birds. Alternatively, the flashing frequency of the lights 410 can be set at any rotational turbine speed or even when blades 430 are stationary.

In addition to the immediate benefits of the present invention, over the time birds are likely to learn to avoid aircraft and wind turbines equipped with the present invention even earlier or even move their nests and roosts away to other areas.

Thus, an improved aircraft lighting system is described above that reduces the incidence of bird strikes on aircraft and wind turbines. In each of the above embodiments, the different positions and structures of the present invention are described separately in each of the embodiments. However, it is the full intention of the inventors of the present invention that the separate aspects of each embodiment described herein may be combined with the other embodiments described herein. Those skilled in the art will appreciate that adaptations and modifications of the just-described preferred embodiment can be configured without departing from the scope and spirit of the invention. Therefore, it is to be understood that, within the scope of the appended claims, the invention may be practiced other than as specifically described herein.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An aircraft lighting system for a jet powered aircraft where the aircraft has a fuselage and an engine nacelle with an engine inlet, the lighting system comprising:
    at least one light mounted on the fuselage aimed at the engine inlet of the engine nacelle, where illumination from the light comprises ultraviolet light and the at least one light flashes at a pre-determined frequency.

2. The aircraft lighting system of claim 1 where the ultraviolet light is between 300 and 400 nm in wavelength.

3. The aircraft lighting system of claim 1 where the pre-determined frequency is between 1 and 3 Hz.

4. The aircraft lighting system of claim 1 where the engine nacelle further comprises engine blades or cones or engine inlet inner surfaces coated in fluorescent or iridescent paint.

5. The aircraft lighting system of claim 1 where the aircraft further comprises an outer engine nacelle and where the lighting system further comprises at least one nacelle light mounted on the engine nacelle aimed at the outer engine nacelle.

6. The aircraft lighting system of claim 1 where the lighting system further comprises a sensor that automatically illuminates the at least one light during take-off and descent.

7. An aircraft lighting system for a jet powered aircraft where the aircraft has a fuselage and an engine nacelle with an engine inlet, the lighting system comprising:
    a first light and a second light both mounted on the fuselage aimed at the engine inlet of the engine nacelle, where illumination from the first and second light comprises ultraviolet light and the first light flashes at 1 HZ and 2 HZ and the second light flashes at 1 HZ and 3 HZ.

8. An aircraft lighting system for a jet powered aircraft where the aircraft has an engine nacelle with an engine inlet and engine blades, the lighting system comprising:
    a first light and a second light both mounted inside the engine inlet aimed at the engine blades, where illumination from the first and second light comprises ultraviolet light and the first light flashes at 1 HZ and 2 HZ and the second light flashes at 1 HZ and 3 HZ.

\* \* \* \* \*